United States Patent
Noguchi (10) Patent No.: US 10,464,404 B2
(45) Date of Patent: *Nov. 5, 2019

(54) DOOR SASH AND METHOD FOR MANUFACTURING SAME

(71) Applicant: Sankei Giken Kogyo Co., Ltd., Isesaki (JP)

(72) Inventor: Ryota Noguchi, Isesaki (JP)

(73) Assignee: Sankei Giken Kogyo Co., Ltd., Isesaki (JP)

( * ) Notice: Subject to any disclaimer, the term of this patent is extended or adjusted under 35 U.S.C. 154(b) by 286 days.

This patent is subject to a terminal disclaimer.

(21) Appl. No.: 15/508,260

(22) PCT Filed: Jul. 7, 2015

(86) PCT No.: PCT/JP2015/069537
§ 371 (c)(1),
(2) Date: Mar. 2, 2017

(87) PCT Pub. No.: WO2016/035445
PCT Pub. Date: Mar. 10, 2016

(65) Prior Publication Data
US 2017/0305246 A1     Oct. 26, 2017

(30) Foreign Application Priority Data

Sep. 4, 2014   (JP) ................................ 2014-180126

(51) Int. Cl.
*E06B 3/00*     (2006.01)
*B60J 10/76*    (2016.01)
(Continued)

(52) U.S. Cl.
CPC .............. *B60J 10/76* (2016.02); *B21D 53/88* (2013.01); *B60J 5/0402* (2013.01); *B60J 10/30* (2016.02); *B60J 10/45* (2016.02)

(58) Field of Classification Search
CPC ... B60J 10/76; B60J 10/30; B60J 10/45; B60J 5/0402
(Continued)

(56) References Cited

U.S. PATENT DOCUMENTS 9,764,625 B2 *    9/2017   Endo ..................... B60R 13/04
10,081,230 B2 *   9/2018   Noguchi ................ B60J 10/24
(Continued)

FOREIGN PATENT DOCUMENTS

JP         08-104139 A      4/1996

OTHER PUBLICATIONS

International Search Report dated Sep. 15, 2015, issued for PCT/JP2015/069537.

*Primary Examiner* — Jerry E Redman
(74) *Attorney, Agent, or Firm* — Locke Lord LLP (57) ABSTRACT

A door sash formed from a single plate material and in which a weather strip is fitted, includes an overlapping section, a stepped section, a tubular section and flange sections. The overlapping section is formed by making the plate materials overlap each other. The stepped section, which extends from a car-interior-side end portion of the overlapping section, has a step bent toward the side on which a window glass is disposed. The tubular section is formed to extend from the stepped section. The flange sections respectively formed to protrude from a car-exterior-side end portion of the overlapping section to both a side on which a window glass is disposed and a side on which a weather strip is fitted. A periphery of an end portion of the plate material extending from the tubular section is formed to come into contact along the plate material forming the stepped section.

2 Claims, 5 Drawing Sheets (51) Int. Cl.
  *B21D 53/88*   (2006.01)
  *B60J 10/00*   (2016.01)
  *B60J 5/04*    (2006.01)
  *B60J 10/30*   (2016.01)

(58) Field of Classification Search
  USPC .......................................................... 49/502
  See application file for complete search history.

(56) References Cited

U.S. PATENT DOCUMENTS

| | | | |
|---|---|---|---|
| 2006/0162258 A1* | 7/2006 | Yamashita | B60J 10/24 49/495.1 |
| 2008/0178531 A1* | 7/2008 | Takeuchi | B60J 1/17 49/475.1 |
| 2009/0195013 A1* | 8/2009 | Suzuki | B60J 5/0402 296/146.5 |
| 2011/0099912 A1* | 5/2011 | Ohtake | B60J 5/0402 49/502 |
| 2014/0059942 A1* | 3/2014 | Goto | E06B 9/42 49/502 |
| 2014/0246878 A1* | 9/2014 | Shimizu | B60J 5/0402 296/146.2 |
| 2017/0305241 A1* | 10/2017 | Noguchi | B60J 10/24 |
| 2017/0305246 A1* | 10/2017 | Noguchi | B21D 53/88 |

* cited by examiner

DOOR SASH AND METHOD FOR MANUFACTURING SAME

CROSS REFERENCE TO RELATED APPLICATIONS

This application is related to co-pending application: "DOOR SASH" filed even date herewith in the name of Ryota Noguchi as a national phase entry of PCT/JP2015/069538, which application is assigned to the assignee of the present application and is incorporated by reference herein.

TECHNICAL FIELD

The present invention relates to a door sash which is used for a window frame or the like of a door of an automobile, and a method for manufacturing the door sash.

BACKGROUND ART

Figure 5:
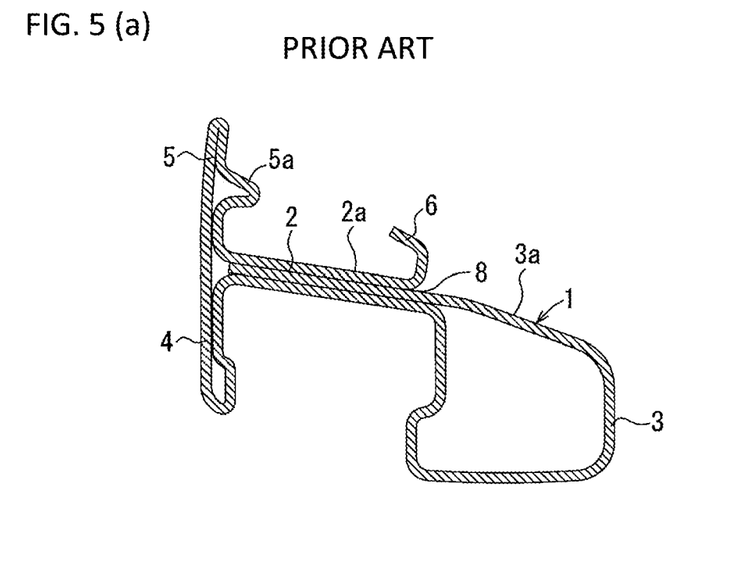
FIG. 5(a) is a cross-sectional view of a door sash according to an example of the related art.
FIG. 5(b) is a cross-sectional view showing a state where a weather strip is mounted on the door sash shown in FIG. 5(a).

A door sash which is used for a window frame or the like of a door of an automobile is generally provided to be roll-formed into the shape shown in FIG. 5 from a plate material which is a single metal strip. A door sash 1 shown in FIG. 5 is configured of an overlapping section 2 in which plate materials are overlapped each other and welded to each other along a longitudinal direction, a tubular section 3 formed at one end portion of the overlapping section 2 and having a substantially D-shape when viewed in a cross section, flange sections 4 and 5 respectively formed to protrude from the other end portion of the overlapping section 2 to both sides, and a holder 6 which is provided on the side opposite to the tubular section 3 with respect to the overlapping section 2 and formed by curving an end portion of the plate material into a substantially semicircular shape.

Further, a glass channel (not shown) is fitted between the tubular section 3 and the flange section 4 protruding downward in FIG. 5, that is, toward a window glass W side. On the other hand, a weather strip 7 is fitted between the holder 6 and the flange section 5 protruding upward in FIG. 5, that is, toward a vehicle main body B side. When the weather strip 7 is fitted, a projection portion 5a of the flange section is fitted into a recess portion 7a of the weather strip 7 and the holder 6 is fitted into a recess portion 7b of the weather strip 7. PTL 1 discloses the same type of door sash.

CITATION LIST

Patent Literature

[PTL 1] JP-A-8-104139

SUMMARY OF INVENTION

Technical Problem

However, in the door sash 1 shown in FIG. 5, a gap 8 is formed between a part where the plate materials of the overlapping section 2 doubly overlap each other and the holder 6. The gap 8 is a portion which is exposed to the outside, and therefore, water tends to stagnate in the gap 8, and the water penetrates between the plate materials configuring the overlapping section 2 due to capillarity, thereby causing the occurrence of such rust. In order to prevent the occurrence of such rust, it is necessary to seal the gap 8 by applying a seal material to the gap 8 along the longitudinal direction of the door sash 1. However, since a step of applying the seal material is added, the effectiveness of a manufacturing process is impeded, and since the gap 8 is a portion to which a coating material does not easily adheres, labor is required to reliably apply the seal material.

Furthermore, various shapes other than the shape shown in FIG. 5 exist in the weather strip 7, and for example, there is also a shape without the recess portion 7b. When fitting the weather strip 7 having such a shape into the door sash 1, it is necessary to cut away the holder 6 of the door sash 1. However, if a cut end portion remaining on the door sash 1 side in a case of cutting away the holder 6 protrudes further toward the side on which the weather strip 7 is fitted than a surface 2a of the overlapping section 2 or a surface 3a of the tubular section 3 on the side on which the weather strip 7 is fitted, the cut end portion interferes with the weather strip 7, and a gap is formed between the door sash 1 and the weather strip 7, so that close contact between the door sash 1 and the weather strip 7 decreases. Further, cutting the holder 6 into a shape in which the cut end portion does not protrude requires complicated work.

The present invention is proposed in consideration of the above problem and provides a door sash in which the occurrence of rust can be prevented and close contact with a weather strip is improved, and a method for manufacturing the door sash.

Solution to Problem

In order to solve the above problem, according to an aspect of the present invention, there is provided a method for manufacturing a door sash which is formed from a single plate material and includes an overlapping section formed by making the plate materials overlap each other, a stepped section which extends from a car-interior-side end portion of the overlapping section and is bent toward the side on which a window glass is disposed, such that a step is formed, a tubular section formed to extend from the stepped section, and flange sections respectively formed to protrude from a car-exterior-side end portion of the overlapping section to both sides, the method including: a roll-forming step of roll-forming a periphery of an end portion of the plate material extending from the tubular section, so as to come into contact along the plate material forming the stepped section, while providing a gap portion between the plate materials forming the stepped section; a press working step of pressing the end portion of the plate material to a position where the end portion does not protrude further toward the side on which a weather strip is fitted than a surface of the overlapping section and a surface of the tubular section on the side on which the weather strip is fitted, such that the gap portion is crushed by the end portion of the plate material; and a welding step of continuously laser-welding the overlapping section along a longitudinal direction of the door sash.

With this configuration, it is possible to manufacture a door sash in which the occurrence of rust can be prevented and close contact with the weather strip is improved.

Further, in the method for manufacturing a door sash according to the above aspect of the present invention, the welding step is to weld a place close to a center of gravity of a cross section orthogonal to the longitudinal direction of the door sash.

With this configuration, it is possible to manufacture a door sash with improved bending resistance properties.

Further, according to another aspect of the present invention, there is provided a door sash which is formed from a single plate material and in which a weather strip is fitted, including: an overlapping section formed by making the plate materials overlap each other; a stepped section which extends from a car-interior-side end portion of the overlapping section and in which a step bent toward the side on which a window glass is disposed is formed; a tubular section formed to extend from the stepped section; and flange sections respectively formed to protrude from a car-exterior-side end portion of the overlapping section to both sides, in which a periphery of an end portion of the plate material extending from the tubular section is formed so as to come into contact along the plate material forming the stepped section, a gap portion formed between the plate materials forming the stepped section is crushed by the end portion of the plate material, and the end portion of the plate material is formed at a position where the end portion does not protrude further toward the side on which the weather strip is fitted than a surface of the overlapping section and a surface of the tubular section on the side on which the weather strip is fitted.

With this configuration, it is possible to prevent the occurrence of rust and improve close contact with the weather strip.

Further, in the door sash according to the above aspect of the present invention, the overlapping section is welded at a place close to a center of gravity of a cross section orthogonal to a longitudinal direction of the door sash.

With this configuration, the bending resistance properties of a welded place are improved.

Advantageous Effects of Invention

According to the method for manufacturing a door sash according to the above aspect of the present invention, it is possible to manufacture a door sash in which the occurrence of rust is prevented and close contact with the weather strip is improved. Further, according to the door sash according to the above aspect of the present invention, it is possible to prevent the occurrence of rust and improve close contact with the weather strip.

DESCRIPTION OF EMBODIMENTS

Hereinafter, a door sash according to an embodiment of the present invention will be described in detail based on the accompanying drawings. FIG. 1(a) is a cross-sectional view of the door sash according to the embodiment of the present invention, and FIG. 1(b) is a cross-sectional view showing a state where a weather strip is mounted on the door sash shown in FIG. 1(a).

Figure 1:
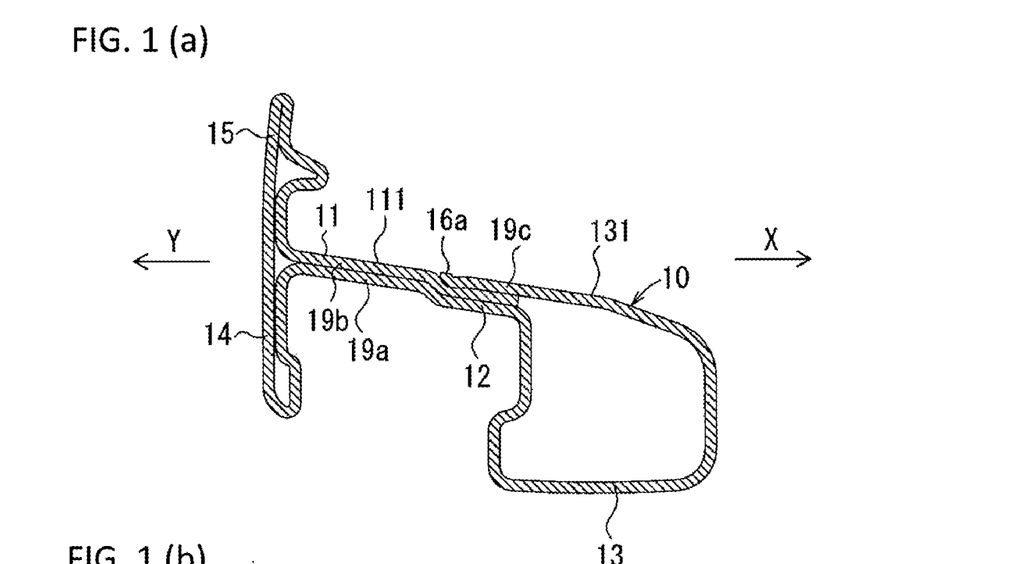
FIG. 1(a) is a cross-sectional view of a door sash according to an embodiment.
FIG. 1(b) is a cross-sectional view showing a state where a weather strip is mounted on the door sash shown in FIG. 1(a).
Figure 4:
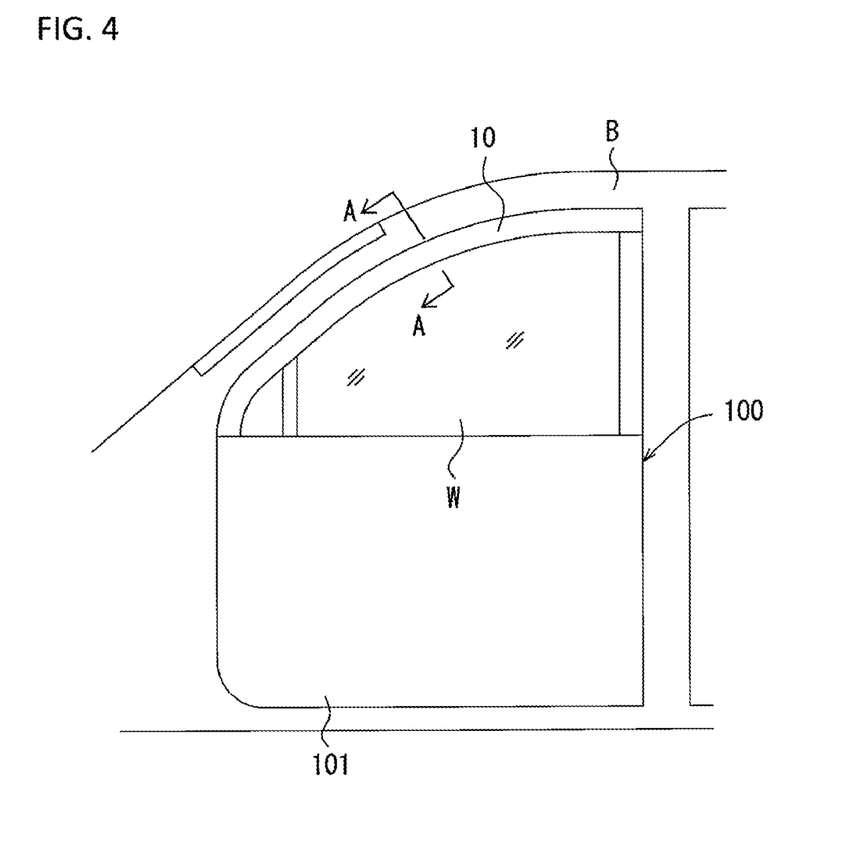
FIG. 4 is a side view showing an example of a vehicle door with the door sash according to the embodiment applied thereto.

A door sash 10 of this embodiment configures a vehicle door 100 of an automobile, as shown in FIG. 4. The vehicle door 100 opens and closes a door opening of a vehicle main body B and has a door main body 101, and the door sash 10 which forms an opening, in which a window glass W moves up and down, in an upper part of the door main body 101. The cross-sectional view shown in FIG. 1 shows a cross-sectional shape in line A-A shown in FIG. 4.

The door sash 10 of this embodiment is formed of a metal strip which is a single plate material, and a weather strip is fitted therein. As shown in FIG. 1, the door sash 10 has an overlapping section 11 formed by making the plate materials overlap each other, a stepped section 12 which extends from a car-interior-side end portion (an end portion in a direction of an arrow X) of the overlapping section 11 and is bent toward the side on which the window glass W is disposed (the lower side in FIG. 1), such that a step is formed, a tubular section 13 formed to extend from the stepped section 12, and flange sections 14 and 15 respectively formed to protrude from a car-exterior-side end portion (an end portion in a direction of an arrow Y) of the overlapping section 11 to both sides.

The overlapping section 11 has a configuration in which plate materials 19a and 19b doubly overlap each other. Specifically, the overlapping section 11 has a configuration in which the plate material 19a which extends so as to be connected from the flange section 14 protruding laterally on the side on which the window glass W is disposed, to the tubular section 13 through the stepped section 12, and the plate material 19b which extends toward the tubular section 13 from the flange section 15 protruding laterally on the side on which a weather strip 17 is fitted, and forms an end portion at the stepped section 12, overlap each other.

The stepped section 12 has a configuration in which a plate material 19c extending toward the flange section 15 from the tubular section 13 additionally overlaps the plate material 19a and the plate material 19b. In this embodiment, the plate materials 19a and 19b are bent toward the side on which the window glass W is disposed, whereby the stepped section 12 is formed, and the periphery of an end portion 16a of the plate material 19c is formed so as to come into contact with the plate material 19b forming the stepped section 12. Further, the end portion 16a of the plate material 19c is a cut end portion remaining after a holder (not shown) is cut away in order to fit the weather strip 17 into the door sash 10.

The tubular section 13 is formed in a substantially D-shape when viewed in a cross section. A glass channel (not shown) is fitted between the tubular section 13 and the flange section 14. On the other hand, the weather strip 17 is fitted on the flange section 15 side. The weather strip 17 has a recess portion 17a formed on the side on which the weather strip 17 comes into contact with the flange section 15, and the recess portion 17a is fitted to a projection portion 15a formed to protrude at the flange section 15. Further, the weather strip 17 is fixed to the tubular section 13 by using a mounting clip 18. With this configuration, the weather strip 17 is fixed to the door sash 10.

The end portion 16a of the plate material 19c is formed at a position where the end portion 16a does not protrude further toward the side on which the weather strip 17 is fitted than a surface 111 of the overlapping section 11 and a surface 131 of the tubular section 13 on the side on which the weather strip 17 is fitted. For example, the end portion 16a is subjected to press working in a direction of an arrow Z shown in FIG. 2(b), thereby being formed at a position where it does not protrude further toward the side on which the weather strip 17 is fitted than the surface 111 of the overlapping section 11 and the surface 131 of the tubular section 13. The deformation amount of the end portion 16a due to press working is entirely absorbed due to a gap portion S shown in FIG. 3, which is formed between the plate materials 19a and 19b forming the stepped section 12, being crushed by the end portion 16a of the plate material 19c, and thus a distortion or the like does not occur in the overlapping section 11 or the tubular section 13.

Next, a method for manufacturing the door sash 10 according to a first embodiment will be described hereinafter. First, a metal strip which is a single plate material is passed between plural sets of forming rolls, thereby being roll-formed into a cross-sectional shape shown in FIG. 2(a). At that time, as shown in FIG. 3, the gap portion S is formed between the plate materials 19a and 19b forming the stepped section 12. Then, at the final stage of the roll-forming, the plate material 19c forming the surface 131 of the tubular section 13 on the side on which the weather strip 17 is fitted is gradually bent, as shown by a two-dot chain line in FIG. 2(a), and the periphery of the end portion of the plate material 19c is disposed so as to come into contact along the plate material 19b forming the stepped section 12. With this disposition, the stepped section 12 has a configuration in which the plate material 19a, the plate material 19b, and the plate material 19c triply overlap each other.

Next, when fitting the weather strip 17 with respect to the door sash 10, a holder 16 which becomes unnecessary is cut away. A cut end portion remaining after the cutting of the holder 16, that is, the end portion 16a protrudes further toward the side on which the weather strip 17 is fitted than the surface 111 of the overlapping section 11 and the surface 131 of the tubular section 13 (refer to FIG. 2(b)). With this shape as it is, when an attempt to fit the weather strip 17 into the door sash 10 is made, the end portion 16a interferes with the weather strip 17.

Figure 2:
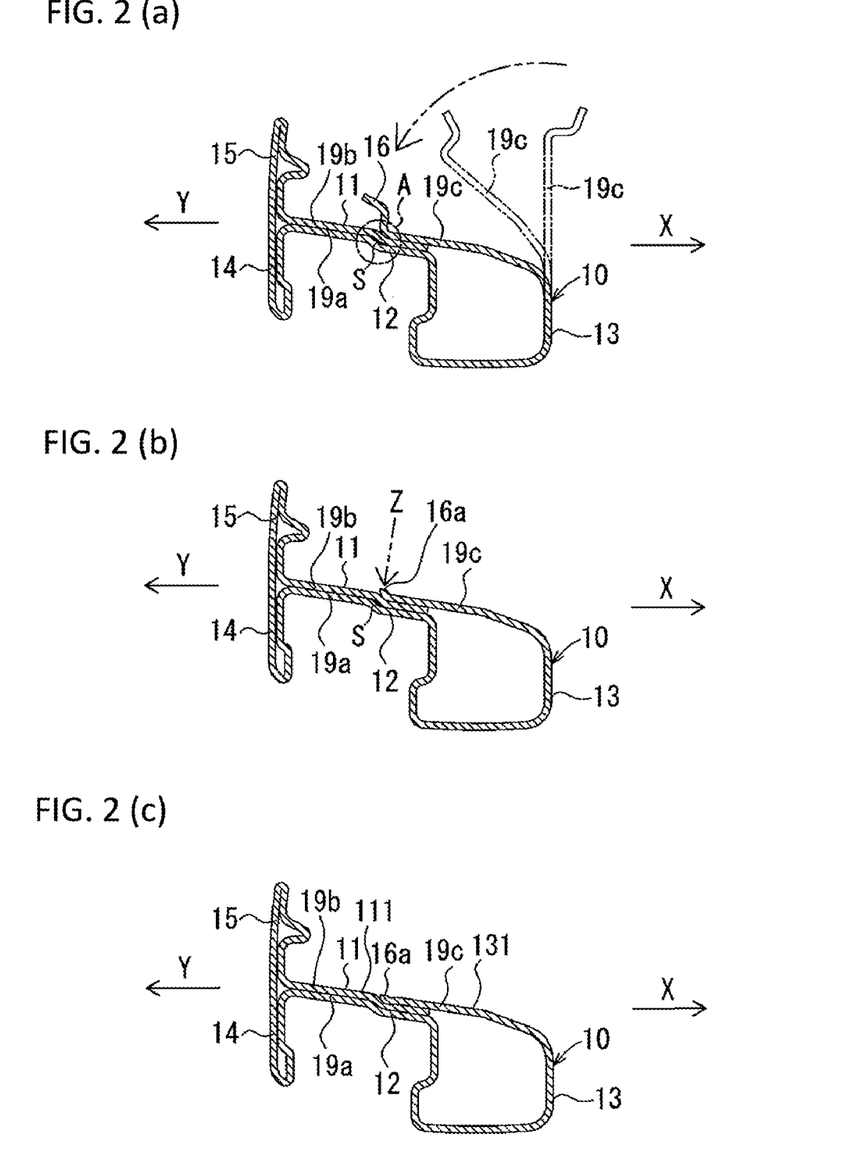
FIGS. 2(a) to 2(c) are schematic diagrams for describing a manufacturing process of the door sash according to the embodiment.
Figure 3:
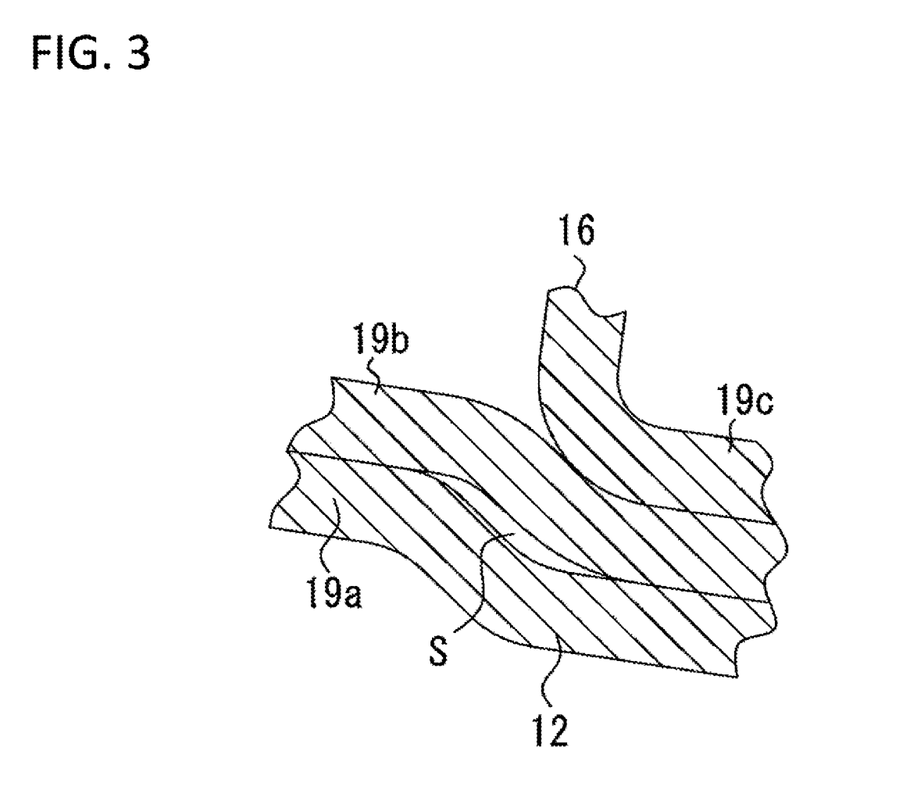
FIG. 3 is a partial enlarged view of a portion A shown in FIG. 2(a).

Therefore, the end portion 16a of the plate material 19c is subjected to press working in the direction of the arrow Z shown in FIG. 2(b) to a position where the end portion 16a does not protrude further toward the side on which the weather strip 17 is fitted than the surface 111 of the overlapping section 11 and the surface 131 of the tubular section 13 on the side on which the weather strip 17 is fitted. At that time, the end portion of the plate material is subjected to press working such that the gap portion S shown in FIG. 3 is crushed by the end portion 16a of the plate material 19c. The end portion 16a of the plate material 19c subjected to press working does not protrude further toward the side on which the weather strip 17 is fitted than the surface 111 of the overlapping section 11 and the surface 131 of the tubular section 13 on the side on which the weather strip 17 is fitted, as shown in FIG. 2(c), and does not interfere with the weather strip 17. The deformation amount of the end portion 16a due to press working is absorbed by the deformation of the stepped section 12, and therefore, a distortion or the like does not occur in the overlapping section 11 or the tubular section 13.

Then, the overlapping section 11 is continuously laser-welded along the longitudinal direction of the door sash 10, that is, in a direction perpendicular to FIG. 1. It is preferable if the welded place is welded at a predetermined place of the overlapping section 11 close to the cross-sectional center of gravity of a cross section orthogonal to the longitudinal direction of the door sash 10, for example, at the stepped section 12. Here, the cross-sectional center of gravity of a cross section orthogonal to the longitudinal direction of the door sash 10 can be calculated in advance by using CAD software such as Auto-CAD, or the like. By being welded at a place close to the cross-sectional center of gravity, it becomes possible to improve the resistance properties in a bending direction of the welded place.

Thereafter, a glass channel (not shown) is fitted and mounted between the tubular section 13 and the flange section 14. Further, the recess portion 17a of the weather strip 17 is fitted to the projection portion 15a formed to protrude at the flange section 15, and the weather strip 17 is fixed to the tubular section 13 by using the mounting clip 18, thereby being fixed to the door sash 10.

In the door sash 10 of this embodiment and the method for manufacturing the door sash 10, the gap 8 formed in the door sash 1 of the related art is not formed, and therefore, a configuration in which water does not penetrate between the plate materials 19a and 19b of the overlapping section 11 is made, and thus the occurrence of rust can be prevented.

Further, in the door sash 10 of this embodiment and the method for manufacturing the door sash 10, the end portion 16a remaining after the cutting of the holder 16 is formed at a position where it does not protrude further toward the side on which the weather strip 17 is fitted than the surface 111 of the overlapping section 11 and the surface 131 of the tubular section 13 on the side on which the weather strip 17 is fitted, and therefore, when the weather strip 17 is fitted into the door sash 10, the end portion 16a does not interfere with the weather strip 17, and thus the close contact between the weather strip 17 and the door sash 10 can be improved. Further, in the door sash 10 of this embodiment and the method for manufacturing the door sash 10, the deformation amount of the end portion 16a due to press working is entirely absorbed due to the gap portion S shown in FIG. 3, which is formed between the plate materials 19a and 19b forming the stepped section 12, being crushed by the end portion 16a of the plate material 19c, and therefore, the outer shape of the door sash 10 is not affected, and a distortion does not occur in the stepped section 12.

Further, in the door sash 10 of this embodiment and the method for manufacturing the door sash 10, it is possible to improve the resistance properties in the bending direction of the welded place of the door sash 10.

MODIFICATION EXAMPLE AND THE LIKE OF EMBODIMENT

The invention disclosed in this specification includes, in addition to the configuration of each invention or embodiment, a configuration specified by changing partial configurations of the above configuration to other configurations disclosed in this specification, within an applicable range, a configuration specified by adding other configurations disclosed in this specification to the above configuration, or a configuration specified to a high-level concept by deleting partial configurations of the above configuration to the extent that a partial operation and effect can be obtained.

REFERENCE SIGNS LIST

10: door sash
11: overlapping section
12: stepped section
13: tubular section
14, 15: flange section
15a: projection portion
16: holder 16a: end portion
17: weather strip
17a: recess portion
18: mounting clip
19a, 19b, 19c: plate material
100: vehicle door
101: door main body
B: vehicle main body
W: window glass

The invention claimed is:

1. A door sash which is formed from a single plate material and in which a weather strip is fitted, comprising:
    an overlapping section formed by making the plate materials overlap each other;
    a stepped section which extends from a car-interior-side end portion of the overlapping section and in which a step bent toward a side on which a window glass is disposed is formed;
    a tubular section formed to extend from the stepped section; and
    flange sections respectively formed to protrude from a car-exterior-side end portion of the overlapping section to both the side on which the window glass is disposed and a side on which the weather strip is fitted,
    wherein a periphery of an end portion of the plate material extending from the tubular section is formed so as to come into contact along the plate material forming the stepped section, a gap portion formed between the plate materials forming the stepped section is crushed by the end portion of the plate material, and the end portion of the plate material is formed at a position where the end portion does not protrude further toward the side on which the weather strip is fitted than a surface of the overlapping section and a surface of the tubular section on the side on which the weather strip is fitted.

2. The door sash according to claim 1, wherein the overlapping section is welded at a place close to a center of gravity of a cross section orthogonal to a longitudinal direction of the door sash.

* * * * *